United States Patent
Guo et al.

(10) Patent No.: US 11,405,358 B2
(45) Date of Patent: Aug. 2, 2022

(54) NETWORK SECURITY MONITORING OF NETWORK TRAFFIC

(71) Applicant: Siemens Aktiengesellschaft, Munich (DE)

(72) Inventors: Dai Fei Guo, Beijing (CN); Xi Feng Liu, Beijing (CN)

(73) Assignee: SIEMENS AKTIENGESELLSCHAFT, Munich (DE)

(*) Notice: Subject to any disclaimer, the term of this patent is extended or adjusted under 35 U.S.C. 154(b) by 34 days.

(21) Appl. No.: 16/490,150

(22) PCT Filed: Mar. 1, 2017

(86) PCT No.: PCT/CN2017/075349
§ 371 (c)(1),
(2) Date: Aug. 30, 2019

(87) PCT Pub. No.: WO2018/157336
PCT Pub. Date: Sep. 7, 2018

(65) Prior Publication Data
US 2020/0007505 A1    Jan. 2, 2020

(51) Int. Cl.
*H04L 9/40* (2022.01)
*H04L 43/16* (2022.01)

(52) U.S. Cl.
CPC .......... *H04L 63/0245* (2013.01); *H04L 43/16* (2013.01); *H04L 63/0263* (2013.01); *H04L 63/1416* (2013.01); *H04L 63/1433* (2013.01)

(58) Field of Classification Search
CPC ............ H04L 63/0245; H04L 63/0263; H04L 63/1416; H04L 63/1433
(Continued)

(56) References Cited

U.S. PATENT DOCUMENTS 6,449,695 B1 * 9/2002 Bereznyi ............. G06F 16/9574
711/134
7,146,644 B2 * 12/2006 Redlich ............... H04L 63/0428
713/166
(Continued)

FOREIGN PATENT DOCUMENTS

CN    103731393 A    4/2014
CN    103825888 A    5/2014
(Continued)

OTHER PUBLICATIONS

Extended European Search Report dated Aug. 18, 2020.
(Continued)

*Primary Examiner* — Dant B Shaifer Harriman
(74) *Attorney, Agent, or Firm* — Harness, Dickey & Pierce, P.L.C.

(57) ABSTRACT

The application includes a data processing device and method. In an embodiment, the data processing device includes a data collection unit, configured to collect data transmitted in a network, and divide the collected data, according to a predetermined feature, into known attack data and unknown attack data. The data processing device further includes a data conversion unit, configured to replace, according to a mapping database, at least a portion of the content included in the unknown attack data with corresponding identification codes. Therefore, the size of data transmitted in the network can be reduced.

21 Claims, 3 Drawing Sheets

(58) Field of Classification Search
USPC .......................................................... 726/22
See application file for complete search history.

(56) References Cited

U.S. PATENT DOCUMENTS

| | | | | |
|---|---|---|---|---|
| 8,321,936 | B1* | 11/2012 | Green | H04L 63/1416 |
| | | | | 718/1 |
| 8,621,634 | B2* | 12/2013 | Turbin | G06F 21/564 |
| | | | | 706/62 |
| 8,935,784 | B1* | 1/2015 | N | G06F 21/562 |
| | | | | 726/22 |
| 9,152,706 | B1 | 10/2015 | Claudatos | |
| 9,973,520 | B2* | 5/2018 | Pevny | G06N 5/045 |
| 2002/0099959 | A1* | 7/2002 | Redlich | G06F 21/554 |
| | | | | 713/150 |
| 2005/0229254 | A1 | 10/2005 | Singh et al. | |
| 2010/0050084 | A1 | 2/2010 | Knapp | |
| 2010/0082513 | A1* | 4/2010 | Liu | G06N 3/006 |
| | | | | 706/46 |
| 2013/0227689 | A1 | 8/2013 | Pietrowicz et al. | |
| 2016/0021122 | A1* | 1/2016 | Pevny | H04L 63/1425 |
| | | | | 726/23 |
| 2016/0036844 | A1* | 2/2016 | Kopp | G06N 5/045 |
| | | | | 726/1 |
| 2016/0080462 | A1* | 3/2016 | Zhang | H04L 69/04 |
| | | | | 709/218 |
| 2016/0119848 | A1 | 4/2016 | Yang et al. | |
| 2017/0054745 | A1* | 2/2017 | Zhang | H04L 63/1425 |
| 2018/0157680 | A1* | 6/2018 | Valsesia | G06V 20/80 |

FOREIGN PATENT DOCUMENTS

| | | |
|---|---|---|
| CN | 104125273 A | 10/2014 |
| CN | 104159249 A | 11/2014 |
| CN | 105429963 A | 3/2016 |
| CN | 105491078 A | 4/2016 |
| CN | 105577685 A | 5/2016 |

OTHER PUBLICATIONS

International Search Report PCT/ISA/210 for International Application No. PCT/CN2017/075349 dated Nov. 30, 2017.
Written Opinion of the International Searching Authority PCT/ISA/237 for International Application No. PCT/CN2017/075349 dated Nov. 30, 2017.
First Office Action dated May 25, 2021 in Chinese Application No. 201780087242.0.

* cited by examiner

NETWORK SECURITY MONITORING OF NETWORK TRAFFIC

PRIORITY STATEMENT

This application is the national phase under 35 U.S.C. § 371 of PCT International Application No. PCT/CN2017/075349, which has an International filing date of Mar. 1, 2017, which designated the United States of America, the entire contents of which are hereby incorporated herein by reference.

FIELD

Embodiments of the present invention generally relate to a data processing device and method.

BACKGROUND

In central network security monitoring, a network traffic collection device can be disposed at an object that needs to be protected to collect network traffic from a network. For example, a Network Security Monitor (NSM) can be disposed in a customer's network to obtain network traffic. The Network Security Monitor (NSM), working in a similar manner to an Intrusion Detection System (IDS), can monitor security events such as Denial of Service, network scanning, and attacks from other networks or applications as triggered by malicious software.

In central network security monitoring, the NSM not only can be set as a detection sensor disposed at a front end in a network environment, but can also be used as a raw data collector. As such, the NSM can capture network data streams as unstructured files such as pcap files, preprocess these data files, and then send them to a central network security monitoring center. Thus, the NSM can be used to help carry out correlation analysis of network security threats.

However, when the monitored network data streams become quite large, a high bandwidth is required to transmit files such as pcap files. In industrial control network applications, a data preprocessing method for conducting, based on correlation, an analysis on collected data before sending the collected data to the central network security monitoring center is proposed to address such a problem. In an industrial control network environment, the network traffic associated with control and monitoring of an automatic production process is relatively constant. Therefore, there is a need to reduce the data that need to be sent and relieve the pressure on the bandwidth by identifying and simplifying known data and processing unknown data alone.

SUMMARY

At least one embodiment of the present invention is designed to provide a data processing device and/or method that improves upon or even solves at least one of the above technical problem and/or other technical problems.

In one embodiment, a data processing device comprises: a data collection unit, configured to collect data transmitted in a network, and divide the collected data, according to a predetermined feature, into known attack data and unknown attack data; and a data conversion unit, configured to replace, according to a mapping database, at least a portion of the content included in the unknown attack data with corresponding identification codes.

In another embodiment, a data processing method comprises: collecting data transmitted in a network, and dividing the collected data, according to a predetermined feature, into known attack data and unknown attack data; and replacing, according to a mapping database, at least a portion of the content included in the unknown attack data with corresponding identification codes.

BRIEF DESCRIPTION OF DRAWINGS

The following drawings are only intended to make a schematic illustration and explanation of the present invention, and do not limit the scope of the present invention. Among them.

DESCRIPTION OF REFERENCE SIGNS

Figure 1:
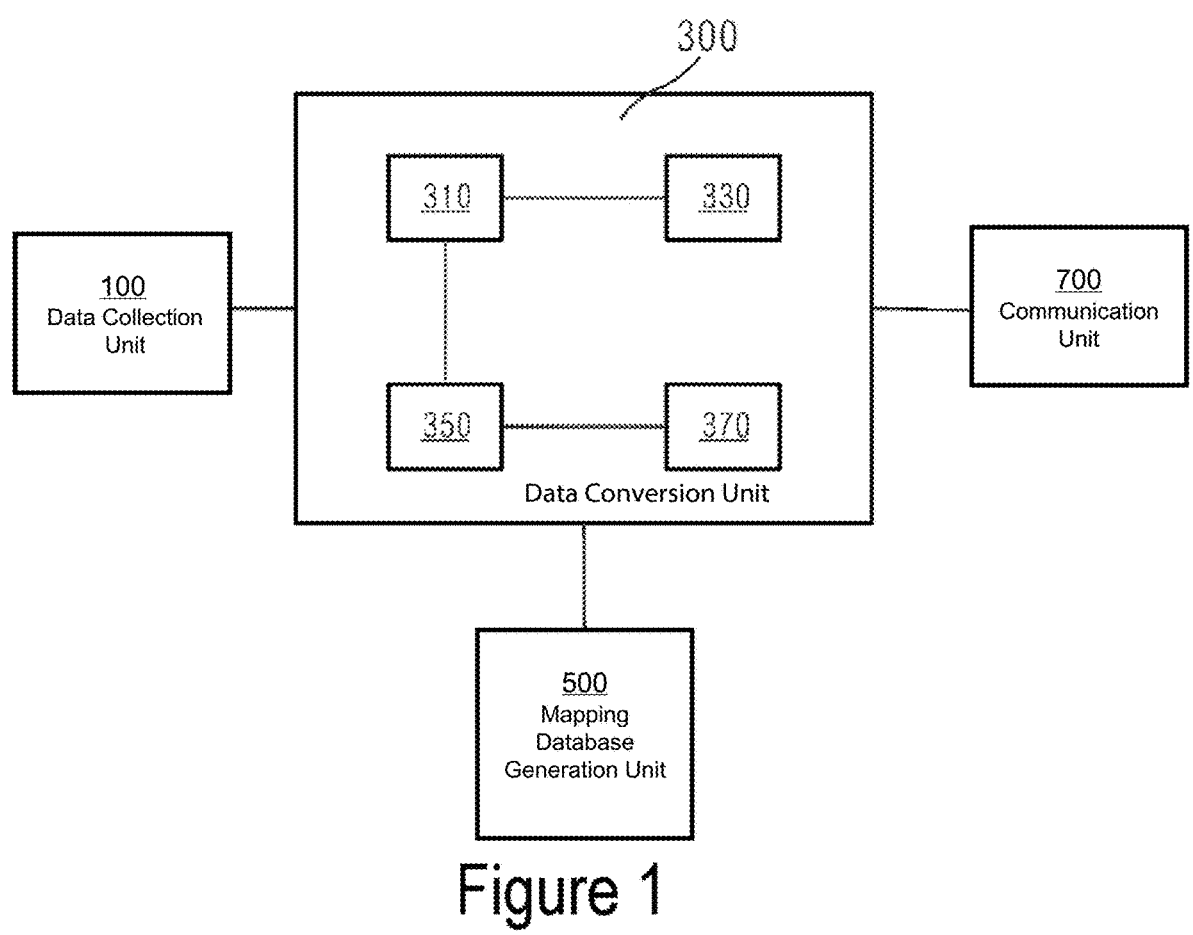
FIG. 1 is a schematic block diagram of a data processing device according to an example embodiment.

100 data collection unit; 300 data conversion unit; 500 mapping database generation unit; 700 communication unit

310 data identification unit; 330 data classification unit; 350 data matching unit; 370 data replacement unit

DETAILED DESCRIPTION OF THE EXAMPLE EMBODIMENTS

In one embodiment, a data processing device comprises: a data collection unit, configured to collect data transmitted in a network, and divide the collected data, according to a predetermined feature, into known attack data and unknown attack data; and a data conversion unit, configured to replace, according to a mapping database, at least a portion of the content included in the unknown attack data with corresponding identification codes. Therefore, the data sent to a central network security monitoring center can be reduced.

In an embodiment, the data conversion unit comprises: a data identification unit, configured to identify content included in the unknown attack data; and a data classification unit, configured to classify, according to identification results of the data identification unit, the content identified by the data identification unit in the unknown attack data. Therefore, the speed and accuracy of the security analysis can be improved.

In an embodiment, the data conversion unit comprises: a data matching unit, configured to determine whether the content in the unknown attack data is identical to historical data previously transmitted in the network and included in the mapping database; and a data replacement unit, configured to replace identical content with identification codes corresponding to the historical data in the mapping database when it is determined that the content in the unknown attack data is identical to the historical data.

In an embodiment, the mapping database includes identification codes corresponding to the historical data and information related to the historical data, and the data matching unit is configured to determine whether the content in the unknown attack data is identical to the historical data according to the information related to the historical data in the mapping database. The information related to the historical data includes a message digest of the historical data, and the data matching unit is configured to obtain a message digest of the content in the unknown attack data and, according to whether the message digest of the content in the unknown attack data is identical to the message digest of the historical data, determine whether the content in the unknown attack data is identical to the historical data. The information related to the historical data includes initial position and length of the historical data, and the data matching unit is configured to select, according to the initial position and length of the historical data, content in the unknown attack data for performing a judgment as to whether it is identical.

In an embodiment, the data processing device further comprises: a mapping database generation unit, configured to generate a mapping database according to historical data previously transmitted in the network. The mapping database generation unit generates a mapping database according to, among the historical data previously transmitted in the network, those pieces having a frequency of occurrence greater than a predetermined threshold value.

In an embodiment, the data processing device further comprises: a communication unit, configured to send data converted by the data conversion unit to the outside.

In another embodiment, a data processing method comprises: collecting data transmitted in a network, and dividing the collected data, according to a predetermined feature, into known attack data and unknown attack data; and replacing, according to a mapping database, at least a portion of the content included in the unknown attack data with corresponding identification codes. Therefore, the data sent to a central network security monitoring center can be reduced.

In an embodiment, the conversion comprises: identifying content included in the unknown attack data; and classifying, according to identification results, the content identified by the data identification unit in the unknown attack data. Therefore, the speed and accuracy of the security analysis can be improved.

In an embodiment, the conversion comprises: determining whether the content in the unknown attack data is identical to historical data previously transmitted in the network and included in the mapping database; and replacing identical content with identification codes corresponding to the historical data in the mapping database when it is determined that the content in the unknown attack data is identical to the historical data. The mapping database includes identification codes corresponding to the historical data and information related to the historical data, and the conversion comprises: determining whether the content in the unknown attack data is identical to the historical data according to the information related to the historical data in the mapping database.

The information related to the historical data includes a message digest of the historical data, and the conversion comprises: obtaining a message digest of the content in the unknown attack data and, according to whether the message digest of the content in the unknown attack data is identical to the message digest of the historical data, determining whether the content in the unknown attack data is identical to the historical data. The information related to the historical data includes initial position and length of the historical data, and the conversion comprises: selecting, according to the initial position and length of the historical data, content in the unknown attack data for performing a judgment as to whether it is identical.

In an embodiment, the method further comprises: generating a mapping database according to historical data previously transmitted in the network. The generating a mapping database comprises: generating a mapping database according to, among the historical data previously transmitted in the network, those pieces having a frequency of occurrence greater than a predetermined threshold value.

In an embodiment, the method further comprises: sending converted data to the outside.

According to example embodiments, the data processing device and method can make correlation analysis of data transmitted in an industrial control network, establish a mapping database, and replace an identical portion in the data with an identification code, thereby reducing data sent to a central network security monitoring center. In addition, the data transmitted in the network can be classified to improve the speed and accuracy of the security analysis.

For a better understanding of the technical features, objectives, and effects of the present invention, the specific manners of implementation of example embodiments of the present invention are hereby described with reference to the drawings.

Figure 2:
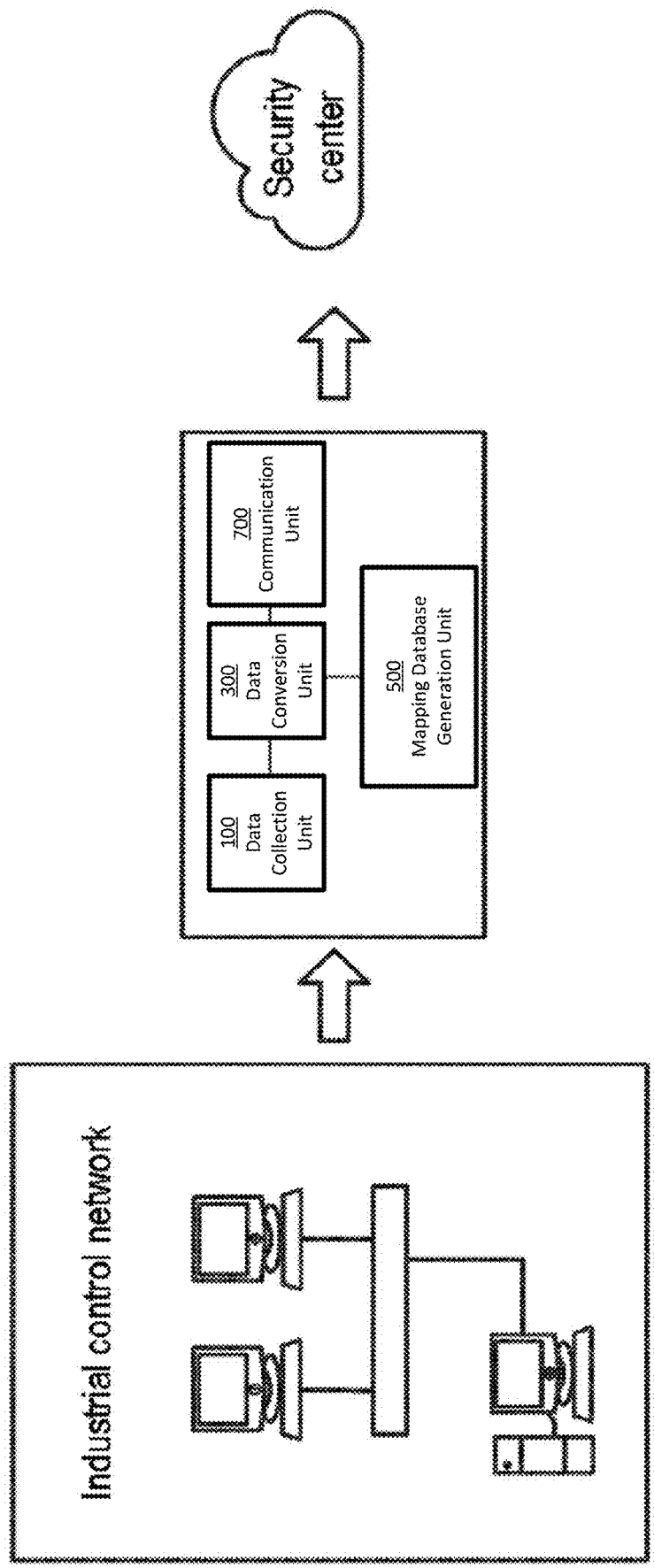
FIG. 2 is a diagram of an example application of a data processing device according to an example embodiment.

FIG. 1 is a schematic block diagram of a data processing device according to an example embodiment, and FIG. 2 is a diagram illustrating an example application of a data processing device according to an example embodiment. Herein, the data processing device according to an example embodiment can collect, e.g., data transmitted in an industrial control network, and process the data to reduce the size of the data, and thereby can transmit via a smaller bandwidth the data reduced by processing. As such, the data processing device is also hereinafter referred to as Data Collecting and Preprocessing Agent.

As shown in FIG. 1, the data processing device according to an example embodiment can comprise a data collection unit 100 and a data conversion unit 300.

The data collection unit 100 can be disposed in a network environment that needs to be protected, such as an industrial control network, to collect data transmitted in the network that needs to be protected. For example, the industrial control network can use Modbus industrial control protocol and FTP protocol, etc.

Having collected the data transmitted in the network that needs to be protected, the data collection unit 100 can divide the collected data into known data and unknown attack data according to a predetermined feature. To be specific, the data collection unit 100 can perform a basic security scanning of the collected data according to the predetermined feature, thereby determining which data in the collected data are data corresponding to attacks that possibly threaten the security of the network that needs to be protected. Herein, the data collection unit 100 can classify the collected data, on the basis of a feature string matching technique of a known attack feature database, into known attack data corresponding to known attacks and unknown attack data corresponding to unknown attacks. As the method is known, a description of the known technique is omitted herein to avoid redundancy.

The data collection unit 100 can filter the known attack data transmitted in the network. The data collection unit 100 can send the determined unknown attack data to the data conversion unit 300. The data conversion unit 300 can replace content included in the unknown attack data with corresponding identification codes according to a mapping database.

To be specific, the data conversion unit 300 can comprise a data identification unit 310 and a data classification unit 330. The data identification unit 310 can identify content included in the unknown attack data. For example, the data identification unit 310 can analyze a protocol used by the unknown attack data for transmission in the network to obtain header data and load data of the unknown attack data. When data transmission is performed by using, for example, Modbus protocol, a protocol label of Modbus can be obtained.

Then, the data classification unit 330 can classify, according to identification results of the data identification unit 310, the content identified by the data identification unit in the unknown attack data. To be specific, the data classification unit 330 can classify the unknown attack data into different categories on the basis of a category database. A data classification database can include category rule information related to different network protocols, such as protocol category, application category, and command category. The category database can be used to classify data on the basis of application scenarios. In the industrial control network, more and more applications are combined with traditional network protocols such as HTTP, FTP, Telnet, and SSH. For example, in the industrial control network of the Siemens PCS7 series, PROFINET, OPC and S7 protocols are adopted. Thus, the category database can store industrial control protocol types and important commands on the basis of data transmitted in the network and construction of the network. For example, when the Modbus protocol is used, the category database can include a protocol label of the Modbus protocol, command category, and the like.

The data conversion unit 300 can further include a data matching unit 350 and a data replacement unit 370. The data matching unit 350 can determine whether content, divided into different categories, in the unknown attack data is partially or totally identical to data included in the mapping database. To be specific, the mapping database can store information related to historical data and identification codes corresponding to the historical data, wherein the information related to the historical data can include message digest of data, related category information, and initial position and length of data. Herein, the historical data refer to those data packets that occur frequently in the data previously transmitted in the network. The message digest can include a hash calculation result of the historical data, such as MD5 and SHA.

The data matching unit 350 can look up information related to the historical data in the mapping database, such as message digest of data, related category information, initial position and length of the data. Then, the data matching unit 350 can perform correlation analysis to find out whether there is content identical to content in the unknown attack data in the mapping database. For example, the data matching unit 350 can locate content in the unknown attack data by means of the initial position of the data in the mapping database, and then determine a hash calculation result of data segments in the unknown attack data which have an identical length from the initial position with the length in the mapping database, thereby determining whether the content in the unknown attack data is identical to the content in the mapping database by judging whether the determined hash calculation result is identical to the message digest in the mapping database.

In addition, for content having an identical initial position in the mapping database, the data matching unit 350 can first calculate and compare whether the hash calculation result of the content having the smallest length is identical to the message digest. When it is determined that they are identical, the data matching unit 350 can calculate and compare whether the second smallest content is identical. As such, when the data matching unit 350 determines that the message digest of the content having the identical length is different from the hash calculation result, the data matching unit 350 can stop running for check. That means that the content that follows behind in the unknown attack data will be different from the historical data that have a greater length in the mapping database.

Then, when the data matching unit 350 determines the content in the unknown attack data that is identical to the historical data in the mapping database, the data matching unit 350 can send the initial position and length information of the identical content in the unknown attack data to the data replacement unit 370.

The data replacement unit 370 can replace the identical content with an identification code, which has a mapping relationship with identical same content, in the mapping database. For example, the data replacement unit 370 can replace the identical content with the identification code from the initial position. As described above, the size of the identification code in the mapping database can be smaller than the size of the data corresponding to the identification code. Therefore, the data obtained after the treatment of replacement with the data replacement unit 370 can be smaller than, e.g., far smaller than, the original unknown attack data.

In addition, the data processing device according to an example embodiment can comprise a mapping database generation unit 500. The mapping database generation unit 500 is used to make correlation analysis of the historical data transmitted in the network, and can extract common or overlapping data that occur frequently. To be specific, the mapping database generation unit 500 can first make statistics of the historical data according to the category information such as protocol category, application category, and command category, thereby obtaining common or overlapping data that have a relatively high frequency of occurrence (e.g., higher than a predetermined threshold value). Then, the mapping database generation unit 500 can set identification codes for the common or overlapping data, and can establish a mapping database based on the identification codes and the information related to the common or overlapping data.

To be more specific, the mapping database generation module 500 can perform maximum matching association scanning on the basis of the historical data. The mapping database generation module 500 can determine which are data that occur frequently in the network according to the predetermined threshold values T1 and T2. If the number of occurrences of the data in the identical category is greater than the first threshold value T1, the mapping database generation module 500 will perform matching calculations of the data that have the identical protocols, applications, and commands. The mapping database generation module 500 will select two pieces of data that have identical protocol information, compare the longest common or overlapping portion between them, and then record the initial position and length of the portion. The mapping database generation module 500 can compare this portion with other data, and store the number of pieces of data that have a portion identical to this portion. If the number is greater than the second threshold value T2, the mapping database generation module 500 can establish a mapping database upon this portion.

In addition, the data processing device can further comprise a communication unit 700. When the content in the unknown attack data is replaced with a shorter identification code to reduce the data size, the communication unit 700 can send the processed data to an external central network security monitoring center. When receiving the processed data, the central network security monitoring center can process the processed data according to the mapping database to restore the unknown attack data, and perform security analysis of the restored unknown attack data.

Figure 3:
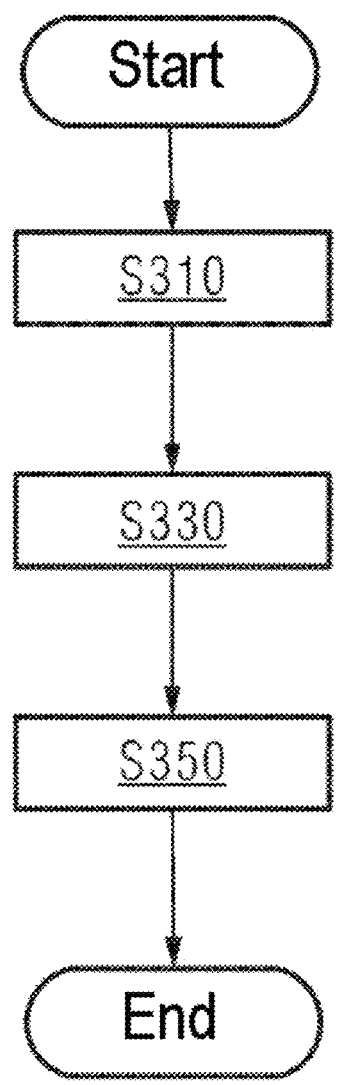
FIG. 3 is a flow diagram of a data processing method according to an example embodiment.

FIG. 3 is a flow diagram of a data processing method according to an example embodiment.

As shown in FIG. 3, first, in the operation S310, data transmitted in the network can be collected and, according to a predetermined feature, the collected data are divided into known attack data and unknown attack data. Then, at least a portion of the content included in the unknown attack data can be replaced with corresponding identification codes according to the mapping database (S330). In addition, in the operation S350, the converted data can be sent to the outside.

In one embodiment, the content included in the unknown attack data can be identified, and then the content identified by the data identification unit in the unknown attack data can be classified according to identification results.

In another embodiment, it can be determined whether the content in the unknown attack data is identical to historical data previously transmitted in the network and included in the mapping database and, when it can be determined that the content in the unknown attack data is identical to the historical data, the identical content is replaced with identification codes corresponding to the historical data in the mapping database.

To be specific, the mapping database can include identification codes corresponding to the historical data and information related to the historical data. In this way, whether the content in the unknown attack data is identical to the historical data is determined according to the information related to the historical data in the mapping database. The information related to the historical data includes a message digest of the historical data. As such, the message digest of the content in the unknown attack data can be obtained, and whether the content in the unknown attack data is identical to the historical data is determined according to whether the message digest of the content in the unknown attack data is identical to the message digest of the historical data. For example, the information related to the historical data includes initial position and length of the historical data. Herein, the content in the unknown attack data for performing a judgment as to whether it is identical is selected according to the initial position and length of the historical data.

The mapping database can be generated according to historical data previously transmitted in the network. For example, a mapping database is generated according to, among the historical data previously transmitted in the network, those pieces having a frequency of occurrence greater than a predetermined threshold value.

According to the example embodiments, the data processing device and method can perform correlation analysis of data transmitted in an industrial control network, establish a mapping database, and replace an identical portion in the data with an identification code, thereby reducing data sent to a central network security monitoring center. In addition, the data transmitted in the network can be classified to improve the speed and accuracy of the security analysis.

It should be understood that, although the description is illustrated by means of various embodiments, not every embodiment includes only one independent technical solution, the narrative way of the description is merely for the sake of clarity. A person skilled in the art should take the description as a whole; the technical solutions in various embodiments can be combined in an appropriate manner to form other manners of implementation that can be understood by a person skilled in the art.

What are mentioned above are only example manners of implementation of the present invention, and are not intended to limit the scope of the present invention. Any equivalent changes, modifications, and combinations that a person skilled in the art make without breaking away from the conception and principle of the present invention should fall within the scope of protection of the present invention.

The invention claimed is:

1. A data processing device, comprising:
a data processor configured to
collect data transmitted in a network,
divide the collected data into known attack data and unknown attack data, according to a feature,
process the collected data by replacing, according to a mapping database, at least a portion of content included in the unknown attack data with corresponding identification codes, the at least the portion of content having a larger data size than the corresponding identification codes, and
send the processed data to a central network security monitoring center for processing according to the mapping database to restore the unknown attack data and perform security analysis of the restored unknown attack data.

2. The data processing device of claim 1, wherein the data processor is configured to
identify the content included in the unknown attack data, and
classify the content included in the unknown attack data.

3. The data processing device of claim 1, wherein the data processor is configured to
determine whether the content included in the unknown attack data is identical to historical data previously transmitted in the network and included in the mapping database, and
replace the content included in the unknown attack data with identification codes corresponding to the historical data in the mapping database in response to determining that the content included in the unknown attack data is identical to the historical data.

4. The data processing device of claim 3, wherein
the mapping database stores the identification codes corresponding to the historical data and information related to the historical data, and
the data processor is configured to determine whether the content included in the unknown attack data is identical to the historical data according to the information related to the historical data.

5. The data processing device of claim 4, wherein
the information related to the historical data includes a message digest of the historical data, and
the data processor is configured to
obtain a message digest of the content included in the unknown attack data, and
determine whether the content included in the unknown attack data is identical to the historical data according to whether the message digest of the content included in the unknown attack data is identical to the message digest of the historical data.

6. The data processing device of claim 4, wherein
the information related to the historical data includes an initial position and length of the historical data, and
the data processor is configured to select, according to the initial position and length of the historical data, the content included in the unknown attack data for performing a judgment as to whether the content included in the unknown attack data is identical to the historical data.

7. The data processing device of claim 3, wherein the data processor is configured to generate the mapping database according to the historical data previously transmitted in the network.

8. The data processing device of claim 7, wherein the data processor is configured to generate the mapping database according to pieces of historical data having a frequency of occurrence greater than a threshold value, from among the historical data previously transmitted in the network.

9. A data processing method, comprising:
collecting data transmitted in a network;
dividing the collected data into known attack data and unknown attack data, according to a feature;
processing the collected data by replacing, according to a mapping database, at least a portion of content included in the unknown attack data with corresponding identification codes, the at least the portion of content having a larger data size than the corresponding identification codes; and
sending the processed data to a central network security monitoring center for processing according to the mapping database to restore the unknown attack data and perform security analysis of the restored unknown attack data.

10. The method of claim 9, wherein the processing the collected data comprises:
identifying the content included in the unknown attack data; and
classifying the content included in the unknown attack data.

11. The method of claim 9, wherein the processing the collected data comprises:
determining whether the content included in the unknown attack data is identical to historical data previously transmitted in the network and included in the mapping database; and
replacing the content included in the unknown attack data with identification codes corresponding to the historical data in the mapping database in response to determining that the content included in the unknown attack data is identical to the historical data.

12. The method of claim 11, wherein
the mapping database stores the identification codes corresponding to the historical data and information related to the historical data, and
the determining includes determining whether the content included in the unknown attack data is identical to the historical data according to the information related to the historical data.

13. The method of claim 12, wherein
the information related to the historical data includes a message digest of the historical data, and
the determining whether the content included in the unknown attack data is identical to the historical data includes
obtaining a message digest of the content included in the unknown attack data, and
determining whether the content included in the unknown attack data is identical to the historical data, according to whether the message digest of the content included in the unknown attack data is identical to the message digest of the historical data.

14. The method of claim 12, wherein
the information related to the historical data includes an initial position and length of the historical data, and
the determining whether the content included in the unknown attack data is identical to the historical data includes selecting, according to the initial position and length of the historical data, the content included in the unknown attack data for performing a judgment as to whether the content included in the unknown attack data is identical to the historical data.

15. The method of claim 11, further comprising:
generating the mapping database according to the historical data previously transmitted in the network.

16. The method of claim 15, wherein the generating the mapping database comprises:
generating the mapping database according to pieces of historical data having a frequency of occurrence greater than a threshold value, from among the historical data previously transmitted in the network.

17. The method of claim 9, further comprising:
sending the processed data outside the network.

18. The data processing device of claim 1, wherein the data processor is configured to send the processed data within the network.

19. The method of claim 9, further comprising:
sending the processed data within the network.

20. The data processing device of claim 1, wherein the at least the portion of content being restorable from the corresponding identification codes using the mapping database.

21. The method of claim 9, further comprising:
restoring the at least the portion of content from the corresponding identification codes using the mapping database; and
performing the security analysis on the at least the portion of content after the restoring.

* * * * *